US012122143B2

(12) United States Patent
Männer et al.

(10) Patent No.: US 12,122,143 B2
(45) Date of Patent: Oct. 22, 2024

(54) METHOD FOR STENCIL PRINTING A LAYER AND PRINTING DEVICE

(71) Applicant: Siemens Aktiengesellschaft, Munich (DE)

(72) Inventors: Ruth Männer, Oberpframmern (DE); Carsten Schuh, Baldham (DE); Roman Karmazin, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/441,479

(22) PCT Filed: Mar. 19, 2020

(86) PCT No.: PCT/EP2020/057610
§ 371 (c)(1),
(2) Date: Sep. 21, 2021

(87) PCT Pub. No.: WO2020/193365
PCT Pub. Date: Oct. 1, 2020

(65) Prior Publication Data

US 2022/0161547 A1 May 26, 2022

(30) Foreign Application Priority Data

Mar. 26, 2019 (EP) ..................................... 19165252

(51) Int. Cl.
*B41F 15/36* (2006.01)

(52) U.S. Cl.
CPC .................................... *B41F 15/36* (2013.01)

(58) Field of Classification Search
CPC .......... B41F 15/20; B41F 15/30; B41F 15/36; B41P 2215/50
See application file for complete search history.

(56) References Cited

U.S. PATENT DOCUMENTS 4,953,460 A 9/1990 Wojcik .......................... 101/129
5,804,248 A 9/1998 Hewett ........................ 427/97.2
(Continued)

FOREIGN PATENT DOCUMENTS

CN 1100368 A 3/1995 .............. B41F 15/22
CN 2491224 Y 5/2002 .............. B41F 15/16
CN 101716847 A 6/2010 .............. B41F 15/36
(Continued)

OTHER PUBLICATIONS

Search Report for EP Application No. 19165252.8, 13 pages, Oct. 25, 2019.

(Continued)

*Primary Examiner* — Christopher E Mahoney
*Assistant Examiner* — Marissa Ferguson-Samreth
(74) *Attorney, Agent, or Firm* — Slayden Grubert Beard PLLC

(57) ABSTRACT

Various embodiments of the teachings herein include a method for stencil printing a layer on or onto a printing surface with a stencil comprising applying a stencil with a first part and a second part to the printing surface and applying a layer of material to the printing surface through the stencil. The first part and the second part cover a non-continuous region of the printing surface.

10 Claims, 1 Drawing Sheet

(56) References Cited

U.S. PATENT DOCUMENTS

| | | | | |
|---|---|---|---|---|
| 2004/0050267 | A1 | 3/2004 | Goss | 101/127.1 |
| 2012/0034381 | A1 | 2/2012 | Wang | 427/259 |

FOREIGN PATENT DOCUMENTS

| | | | | | |
|---|---|---|---|---|---|
| CN | 103657977 | A | | 3/2014 | B05C 21/00 |
| CN | 105034553 | A | | 11/2015 | B41F 15/08 |
| CN | 206781222 | U | | 12/2017 | B41F 15/08 |
| DE | 87 00 806 | | | 3/1987 | B41F 15/26 |
| EP | 0842771 | | * | 5/1998 | |
| GB | 926963 | A | | 5/1963 | H05K 3/20 |
| GB | 1 068 805 | | | 5/1967 | |
| JP | H07 30256 | | | 1/1995 | H05K 3/46 |
| JP | 2006224057 | A | * | 8/2006 | B05D 1/40 |
| JP | 2006231122 | A | | 9/2006 | B05C 11/04 |
| JP | 2006231194 | A | * | 9/2006 | |
| JP | 2006231235 | A | * | 9/2006 | |
| JP | 2014144425 | A | * | 8/2014 | |
| KR | 101700688 | B1 | | 2/2017 | B05D 1/28 |

OTHER PUBLICATIONS

Search Report for International Application No. PCT/EP2020/057610, 17 pages, Apr. 30, 2020.

Chinese Office Action, Application No. 202080023698.2, 9 pages, Jun. 14, 2022.

China Packaging Technology Association, "China Packaging Yearbook 2003," China Materials Press; ISBN: 7-5047-2082-8, 30 pages (Chinese w/ English translation), 2004.

Hong, Cheng, "Einführung in die Druckausrüstung," China Light Industry Press, ISBN: 978-7-5019-7376-7, 40 pages (Chinese w/ English translation), 2010.

Chinese Office Action, Application No. 202080023698.2, 7 pages, Aug. 7, 2023.

* cited by examiner

METHOD FOR STENCIL PRINTING A LAYER AND PRINTING DEVICE

CROSS-REFERENCE TO RELATED APPLICATIONS

This application is a U.S. National Stage Application of International Application No. PCT/EP2020/057610 filed Mar. 19, 2020, which designates the United States of America, and claims priority to EP Application No. 19165252.8 filed Mar. 26, 2019, the contents of which are hereby incorporated by reference in their entirety.

TECHNICAL FIELD

The present disclosure relates to stencil printing. Various embodiments of the teachings herein may include methods for stencil printing a layer, e.g., a stator laminate and/or rotor laminate, and/or printing devices.

BACKGROUND

Stencil printing may be used to manufacture layers. The printing of complex structures with a high thickness of several 100 μm nevertheless poses a challenge in the case of stencil printing, since with complex structures high surface quality and high geometrical accuracy and reproducibility are difficult to achieve. The printing of structures which take up repeated continuous regions is difficult in the case of stencil printing since webs, which hold inner molded parts of stencils, on the surface of workpieces result in depressions in the form of channels, for instance. Printing paste cannot be deposited on regions of workpieces placed under such webs, with the result that during stencil printing the surface quality frequently suffers.

SUMMARY

Various embodiments of the teachings herein include methods for stencil printing a layer, by means of which it is possible to manufacture layers with high surface quality and/or a printing device by means of which the methods herein for stencil printing can be executed. For example, some embodiments include a method for stencil printing a layer (50) on or onto a printing surface (30) by means of a stencil, in which a stencil with at least one first (70) and one second part (90) is used, wherein the first (70) and the second part (90) cover a non-continuous region of the printing surface (30).

In some embodiments, the stencil, in particular during the stencil printing, leaves a repeated continuous part of the printing surface (30) uncovered.

In some embodiments, the first part (70) surrounds the second part (90) circumferentially or the second part surrounds the first part circumferentially.

In some embodiments, the first part (70) is or will be arranged on a printing table (20).

In some embodiments, the second part (90) is or will be arranged on or onto the printing surface (30).

In some embodiments, the layer is a laminate.

In some embodiments, the laminate is a magnetic laminate and/or a rotor laminate and/or a stator laminate.

As another example, some embodiments include a printing device for executing a method as claimed in one of the preceding claims with a printing surface (30), a printing head (110) and a printing frame (70) which can be placed between the printing surface (30) and printing head (110) and a stencil with at least one first (70) and one second part (90), wherein the first part (70) and the second part (90) are embodied and arranged so that a non-continuous region of the printing surface (30) can be covered with the first and the second part in particular, wherein the first part (70) is arranged on a printing frame (70) and the second part (90) is arranged on a printing surface (30).

In some embodiments, the printing surface (30) is arranged on a printing table (20) of the printing device (10) or in which the printing table has the printing surface.

In some embodiments, the printing frame (70) is arranged on a cover (60) of the printing device (10).

BRIEF DESCRIPTION OF THE DRAWINGS

The teachings herein are explained in more detail below on the basis of an exemplary embodiment shown in the drawings, in which.

DETAILED DESCRIPTION

Figure 1:
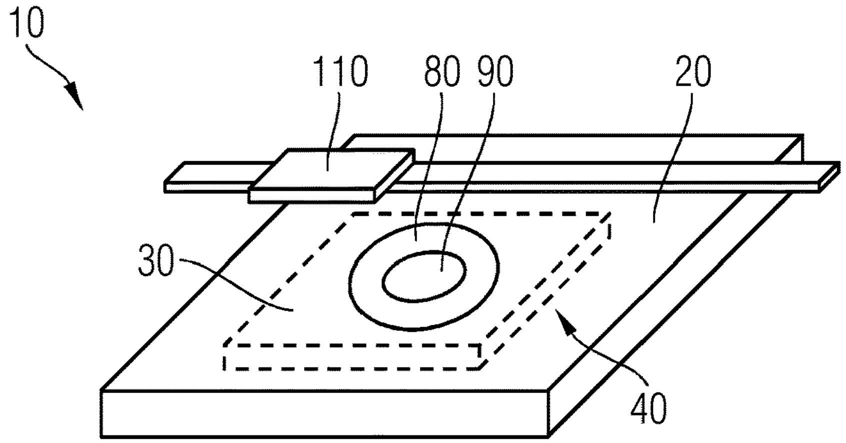
FIG. 1 shows in a schematic perspective representation an example printing device incorporating teachings of the present disclosure during the execution of an example method for stencil printing a magnetic laminate incorporating teachings of the present disclosure.

Some embodiments of the teachings herein include a method for stencil printing a layer, a stencil is used to print on or onto a printing surface. A stencil with at least one first and one second part is used, wherein the first and second part cover a non-continuous region of the printing surface. The region of the printing surface covered by the first part and the regions of the printing surface covered by the second part are preferably distanced from one another, in particular in a spatial direction in Cartesian coordinates or in a radial direction in polar coordinates.

By means of these methods for stencil printing, it is consequently possible to print one such part of the printing surface which is not covered by the first and second part. One such part of the printing surface which is not covered by the first and second part can constitute a repeated continuous area of the printing surface, so that even complex regions of the printing surface can be printed. On account of the non-continuous region, which is covered by the first and second part, the first and second part need not be connected with webs, so that a layer also need not experience losses in the surface quality caused as a result of the webs.

The methods can consequently be used to manufacture a layer with a particularly high surface quality. In some embodiments, the first and second part are not connected by means of further parts of the stencil, so that no web covering the printing surface or other further part covering the printing surface or connecting the first and second part has to be arranged between the first and second part. there are thus also no other parts which cover a part of the printing surface which leads from the first to the second part, so that in this respect the surface quality of a workpiece is also not reduced.

Within the context of the present disclosure, “repeated continuous” is to be understood in the topological sense, wherein here region or area mean in each case two-dimensional, in other words planar, structures. Examples of this use of the term can be taken in particular from the publication by W. Wagner and F. Gruttmann, Technische Mechanik [Engineering mechanics], volume 23, issue 2-4 (2003), 261-264. In particular, a repeated continuous surface generally has a hole or a number of holes: Therefore an O- or P-shaped region is continuous at two points, for example, while a B-shaped area is continuous at three points.

In particular, here an area which is referred to as continuous at (n+1) points has n holes, wherein n refers to a natural number. Accordingly, the term "not continuous" is to be understood. Here areas or regions which are not continuous with one another mean in particular such two-dimensional surfaces which are truly distanced from one another, in other words at a distance of greater than zero, for instance two concentric circular rings which are distanced radially from one another or surfaces distanced from one another in Cartesian coordinates in a spatial direction.

In some embodiments, the stencil, particularly during the stencil printing, leaves a repeated continuous part of the printing surface uncovered. In this way the repeated continuous part of the printing surface can be printed. The methods taught herein can consequently be used to manufacture a repeated continuous, preferably ring-shaped, layer, in particular a laminate, in particular in the manner of a mathematical cylinder with a base surface in the shape of a repeated continuous area, which corresponds to the repeated continuous part of the printing surface. Since the repeated continuous part remains uncovered, a repeated continuous layer can be printed with a high surface quality by means of the inventive method.

In some embodiments, the first part surrounds the second part circumferentially. In some embodiments, the second part surrounds the first part circumferentially. A part of the printing surface that is continuous at at least two points can be printed so that in particular ring-shaped structures, for instance circular ring-shaped structures, can be printed.

In some embodiments, layers in the shape of laminates, in particular magnetic laminates, for rotors and/or stators of electric machines can be printed. Laminates such as in particular magnetic laminates previously could not be manufactured by means of stencil printing, since a sufficiently good surface quality cannot be achieved by means of stencil printing. Such structures regularly comprise repeated continuous structures, such as in particular ring-shaped structures, for instance rings of soft-magnetic or magnetic flux-conducting materials. Such structures required for electric machines can be easily and efficiently manufactured by means of the methods described herein. In some embodiments, the first part is preferably arranged on a printing table or the inventive method is carried out with a printing table on which the first part is arranged.

In some embodiments, the printing table comprises a printing frame, upon which the first part is arranged. Such a printing frame can be placed on the printing surface or pivoted into the printing surface so that the first part with the printing frame can be positioned in or on the printing surface.

In some embodiments, the second part is arranged on the printing surface or the second part may be arranged on the printing surface. The second part will be or is placed or laid on or onto the printing surface, wherein the second part will be or is attached on or onto the printing surface in particular in a force-fit or material-bonded manner. In some embodiments, the second part will be sucked onto the printing surface, for instance by means of channels leading through the printing surface.

In some embodiments, the magnetic laminate is a rotor laminate and/or a stator laminate. As already described previously, a rotor and/or stator can be formed by means of magnetic laminates.

In some embodiments, layers such as laminates, e.g. magnetic laminates, can be manufactured with planar structures by means of stencil printing so that the methods described herein can be used with this manufacturing method.

In some embodiments, the layer is formed and/or subsequently thermally processed, in particular debindered and/or sintered, with a powder-based material, in particular a printing paste. In this way, a workpiece in the shape of a green part can firstly be printed by means of stencil printing, which is thermally processed in a last step of the methods described herein.

As an example, a printing device to execute a method as described previously has a printing surface, a printing head, and a printing frame arranged movably between the printing surface and printing head and a stencil with at least one first and one second part, wherein the first part and the second part are arranged so that a non-continuous region of the printing surface can be covered with the first and the second part, wherein the first part of the stencil is arranged on the printing frame and the second part is arranged on the printing surface. An already premanufactured magnetic laminate may form part of the printing device, since to some extent the magnetic laminate can hold, i.e. support, the second part of the stencil as a stencil carrier. Here the first part and the second part of the stencil are expediently identical to the first part and the second part of the stencil as described above in relation to the method described herein.

In some embodiments, the printing device has a printing table on which the printing surface is arranged, or which has the printing surface. With the printing devices described herein, the printing head may be arranged movably on the printing table so that the printing head can move the printing surface on the printing table, i.e. can move along the printing surface of the same for printing purposes at least in regions.

In some embodiments, the printing frame is arranged on a cover of the printing device, which can be pivoted toward the printing surface. In this way the cover with the first part of the stencil can be pivoted toward the printing surface.

Figure 2:
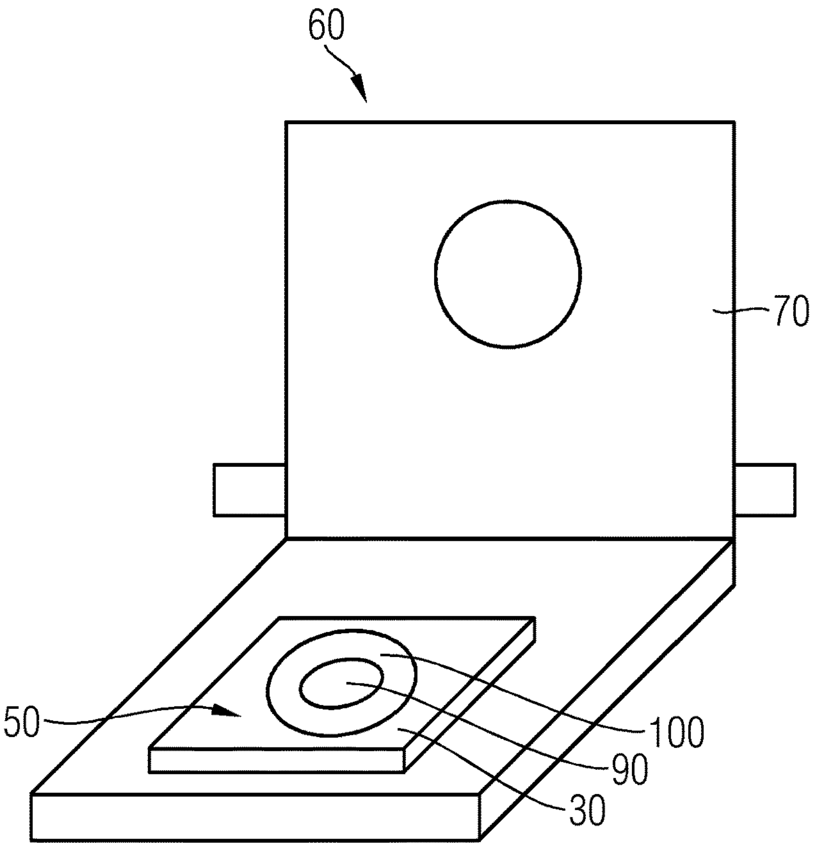
FIG. 2 shows a schematic perspective representation of the example printing device according to FIG. 1 in a folded-out state, in which a workpiece manufactured by means of the printing device can be removed.
Figure 3:
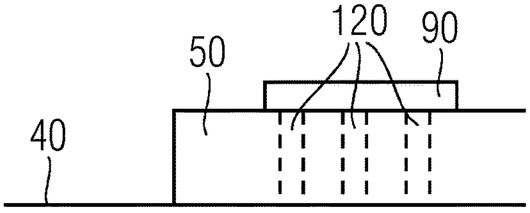
FIG. 3 shows a schematic cross-sectional representation of the workpiece according to FIG. 2 with a second part of a stencil.

The example printing device 10 shown in FIGS. 1 to 3 comprises a printing table 20 with a printing surface 30, which is located on a substrate 40. On the substrate 40 the workpiece 50 can be printed on the printing surface 30 of the substrate 40 by means of the methods described herein. To this end the printing device 10 comprises on the one hand a cover 60 with a printing frame 70, which can be pivoted onto the printing surface 30 so that the printing frame 70 covers the printing surface 30.

The printing frame consequently forms a first part 70 of a stencil, which overlaps part of the printing surface 30. The first part 70 of the stencil here overlaps an outer region of the printing surface 30 so that an inner part 80 of the printing surface 30 remains uncovered by the first part 70 of the stencil. A second part 90 of the stencil is located within this part which remains uncovered by the first part 70 of the stencil, said second part covering an inner part of the printing surface 30 which is not continuous with the region of the printing surface 30 covered by the first part 70 of the stencil. The first 70 and second part 90 of the stencil consequently leave a ring-shaped region 100 of the printing surface 30 of the substrate 40 open, so that a ring-shaped region 100 of the workpiece 50 can be printed.

In order to print this region 100, a printing head 110 is arranged on the printing table 20 which can be moved along the printing surface 30 and can therefore print regions of the printing surface 30 not covered by the stencil 70, 90. The printing head 110 is embodied for stencil printing. The printing head 110 is fed by a printing paste supply (not shown separately), which supplies a particle-based printing paste, in the embodiment shown here a printing paste with metallic particles, to the printing head 110. In principle, in further exemplary embodiments not shown separately, other materials, for instance printing pastes with ceramic particles, can be supplied instead of or in addition to printing pastes with metallic particles.

The second part 90 of the stencil is placed on the printing surface 30 of the substrate 40 and held on the printing surface 30 of the substrate 40 by way of a vacuum. To this end air is sucked through several channels 120 passing through the substrate 40 to the surface, on a surface of the substrate 40 facing away from the printing surface 30, so that the second part 90 of the stencil is sucked onto the printing surface 30. In the embodiment shown, the printing head 110 is movably arranged on the cover 60. The free region of the printing surface 30 which is not covered by the first part 70 of the stencil and second part 90 of the stencil, can be printed so that a ring-shaped workpiece 50 can be manufactured by means of the printing device 10. The example method can consequently be executed with a high surface quality using the example printing device 10.

The printed workpiece 50 forms a green part which is printed by means of stencil printing and which is then thermally processed, e.g., debindered and sintered. The workpiece 50 forms a layer in the shape of a ring-shaped magnetic laminate, in the embodiment shown a rotor laminate or a stator laminate.

What is claimed is:

1. A method for stencil printing a layer on or onto a printing surface with a stencil, the method comprising:

applying a stencil with a first part and a second part to the printing surface;

wherein the first part and the second part cover a non-continuous region of the printing surface; and applying a layer of material to the printing surface through the stencil;

wherein the second part is connected to the printing surface by a material bond or a negative pressure applied using a vacuum channel leading through the printing surface.

2. The method as claimed in claim 1, wherein the stencil leaves a repeated continuous part of the printing surface uncovered.

3. The method as claimed in claim 1, wherein the first part surrounds the second part circumferentially.

4. The method as claimed in claim 1, further comprising arranging the first part on a printing table.

5. The method as claimed in claim 1, further comprising arranging the second part on or onto the printing surface.

6. The method as claimed in claim 1, wherein the layer is a laminate.

7. The method as claimed in claim 1, wherein the laminate comprises a magnetic laminate and/or a rotor laminate and/or a stator laminate.

8. The printing device as claimed in claim 1, wherein the printing frame is arranged on a cover of the printing device.

9. A printing device comprising:

a printing surface;

a printing head;

a printing frame which can be placed between the printing surface and printing head; and a stencil with a first part and a second part;

wherein the first part and the second part are arranged so a non-continuous region of the printing surface can be covered with the first part and the second part; and wherein the first part is arranged on a printing frame and the second part is arranged on a printing surface;

wherein the second part is connected to the printing surface by a material bond or a negative pressure applied using a vacuum channel leading through the printing surface.

10. The printing device as claimed in claim 9, wherein the printing surface is arranged on a printing table of the printing device or in which the printing table has the printing surface.

* * * * *